(12) United States Patent
Wang et al.

(10) Patent No.: US 6,901,807 B1
(45) Date of Patent: Jun. 7, 2005

(54) POSITIVE AND NEGATIVE PRESSURE SENSOR

(75) Inventors: Tzu-Yu Wang, Maple Grove, MN (US); Eugen I Cabuz, Edina, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/915,869

(22) Filed: Aug. 9, 2004

Related U.S. Application Data

(63) Continuation-in-part of application No. 10/748,817, filed on Dec. 30, 2003.

(51) Int. Cl.$^7$ .............................................. G01L 9/12
(52) U.S. Cl. ...................................................... 73/718
(58) Field of Search ............... 73/718, 724; 361/283.1, 361/283.2, 283.3, 283.4

(56) References Cited

U.S. PATENT DOCUMENTS

| | | | | |
|---|---|---|---|---|
| 4,606,228 A | * | 8/1986 | Whitmore | ..................... 73/718 |
| 5,679,902 A | * | 10/1997 | Ryhanen | ........................ 73/78 |

* cited by examiner

*Primary Examiner*—William Oen
(74) *Attorney, Agent, or Firm*—Kris T. Fredrick

(57) ABSTRACT

A device for sensing pressure using two perforated rigid films in which a diaphragm is mounted between the first two films. The device senses positive and negative pressure through a port or opening to the region for which pressure data is desired. The device communicates capacitive pressure and changes in that pressure. The flexible diaphragm is spaced from the first and second films such that the flexible diaphragm is adapted to flex toward the first film when pressure increases in the opening and is adapted to flex toward the second film when pressure decreases in the opening to change the capacitance between the diaphragm and at least one of the first and second films. Spacers are used to position all three elements.

13 Claims, 1 Drawing Sheet

POSITIVE AND NEGATIVE PRESSURE SENSOR

This is a continuation-in-part of a prior application filed on Dec. 30, 2003, having Ser. No. 10/748,817, which is incorporated herein by reference in its entirety.

FIELD OF THE INVENTION

The present invention relates in general to pressure sensor technology and, more particularly, to low cost pressure sensors for either disposable or high volume applications of pressure sensors for gas and liquid based pressure sensing of either positive or negative pressure changes.

SUMMARY OF THE INVENTION

The present invention provides improvements in low cost, effective meso-pressure sensors that are capable of measuring both positive and negative pressure, depending upon the atmosphere to which it is exposed. The sensor includes a sealed chamber defining part and can be made from inexpensive, injection molded plastics and plastic films that are readily available from many commercial sources.

A first perforated rigid film having a conductive surface is mounted on one side in communication with the chamber in the sealed chamber defining part and on a first insulator mounted on the other side. A non-perforated flexible diaphragm having a conductive surface is mounted in communication with the first insulator. A second insulator is mounted on the non-perforated diaphragm to separate it from a second perforated rigid film. Finally, a sensor chamber defining part is mounted on the other side of the second flexible diaphragm to provide an opening for communication with a sensing atmosphere.

Appropriate electrical connections contacting the first and the second films and the non-perforated flexible diaphragm are used to measure the capacitance between the diaphragms as a function of the pressure in the sensor chamber introduced through the opening and causing the non-perforated diaphragm to move with respect to one of the perforated flexible diaphragms.

BRIEF DESCRIPTION OF THE DRAWINGS

For a more complete understanding of the invention, reference is hereby made to the drawings, in which.

In the figures, like reference characters designate identical or corresponding components and units throughout the several views.

DETAILED DESCRIPTION OF THE PREFERRED EMBODIMENT

The pressure sensors of this invention have elements disclosed in a prior, commonly owned application by the same inventors and filed on Dec. 30, 2003, having Ser. No. 10/748,817, which has been incorporated herein above by reference in its entirety.

Figure 1:
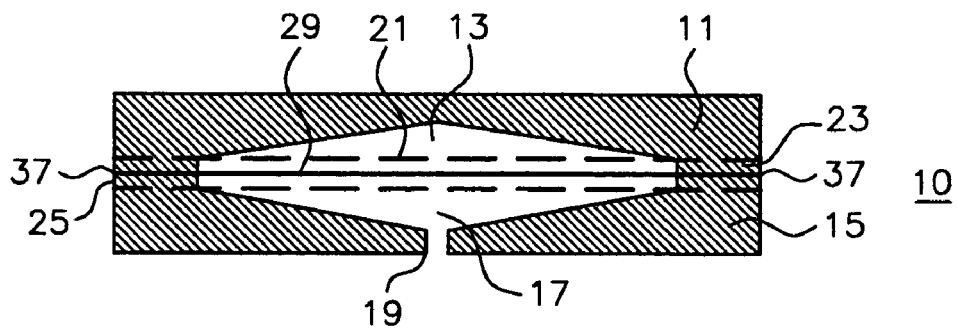
FIG. 1 is a side elevational view, in section, of the present invention as a positive and negative pressure sensor.

Referring to the figures, FIG. 1 illustrates a pressure sensor 10 generally that has an upper chamber forming element 11 defining closed chamber 13 and a lower chamber forming element 15, to define an open chamber 17, having port 19. The chamber defining elements 11 and 17 may be made from plastic or other nonconductive materials and may be molded or fabricated. Neither part 11 or 17 has any metallization or other patterning. An upper or first perforated film 21 is mounted on the closed chamber forming element 11 and has first insulator or spacer 23 on its other side. Film 21 may be a plastic film with metallization or a dielectric film. Film 21 is perforated and may remain rigid during operation.

A lower or second perforated film 27 is mounted on the lower chamber forming element 15 and on the other side of spacer 25. Film 27 may be a plastic film, either with metallization or formed from dielectric film and communicates with sealed cavity or closed chamber 13. Spacer 25 is also preferably made from plastic and contains no metallization.

A flexible, non-perforated middle diaphragm 29 is mounted between spacers 23 and 25. Non-perforated diaphragm 29 makes capacitive bridge differential cooperating with either film 21 or 27, depending on whether the pressure in chamber 17 has increasing or decreasing pressure. Non-perforated diaphragm will move toward film 21 with increased pressure in chamber 17 and toward film 27 when pressure in chamber 17 decreases.

Figure 2:
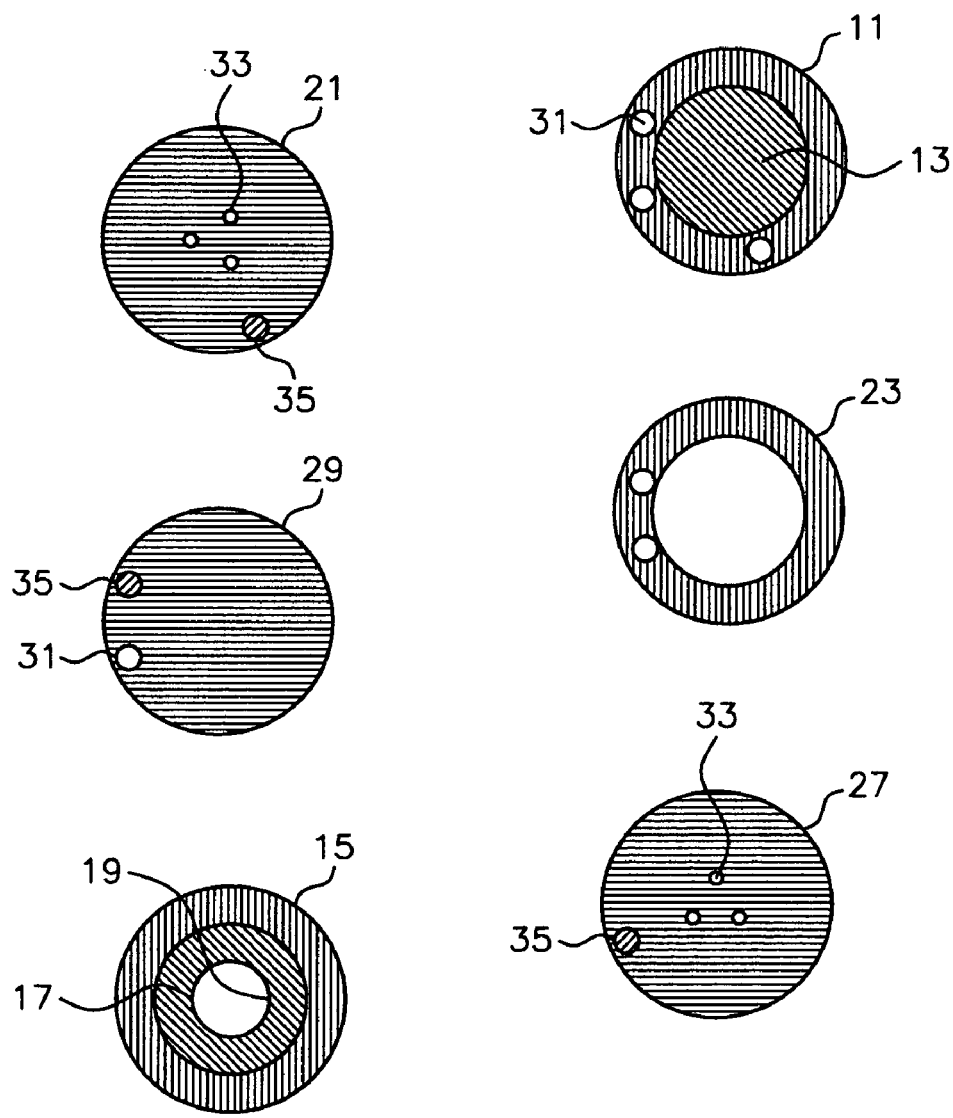
FIG. 2 is an exploded plan view of the embodiment shown in FIG. 1.

FIG. 2 is an exploded view of the parts of FIG. 1, shown in plan view. Upper chamber forming element 11 includes cavity 13 and holes 31 which are open for electrical contact. Film 21 includes hole 31 for electrical contact, and has holes or perforations 33 and includes a contact point 35. Spacer 23 also has a hole 31 for electrical contact. Film 27 is also perforated with holes 33 and has contact point 35 for contact. Finally, lower chamber defining element 15 provides pressure access via port 19 and includes cavity 17.

Holes 33 in films 21 and 27 are shown in FIG. 2 as being equally spaced from the center of the films. This is only shown to illustrate the existence of the holes 33. Holes 33 can be place anywhere on films 21 and 27, such as, for example, closer to the periphery of the films 21 and 27, or in a pattern where some or all holes are in a different orientation with respect to rest of the holes. The placement of holes on film 21 does not have to be the same as on film 27. The number of holes may be as few as one and as many as desired. Any pattern may be used. The function of the holes is to permit pressure changes to be communicated to the device to permit diaphragm 29 to change the capacitive relationship with either film 21 or 27, or both.

As can be appreciated, the device of FIGS. 1 and 2 provides for diaphragm deflection of the non-perforated diaphragm 29 toward either of the two perforated films and the addition of this diaphragm permits the device to have much more versatility than prior designs. The sensing atmosphere may be any fluid, including gases such as the atmosphere, gas pumps, chemical and electrolytic reactions, and the like or including liquids such as reactors, test devices, pumps and the like.

While particular embodiments of the present invention have been illustrated and described, they are merely exemplary and a person skilled in the art may make variations and modifications to the embodiments described herein without departing from the spirit and scope of the present invention. All such equivalent variations and modifications are intended to be included within the scope of this invention, and it is not intended to limit the invention, except as defined by the following claims.

What is claimed is:

1. In a device for sensing pressure having a sealed chamber defining part, a first perforated film having two sides and mounted on one side in communication with said chamber in said sealed chamber defining part, said first film having a conductive surface, an insulator mounted on said other side of said first film, a second perforated film having two sides and mounted on one side in communication with said insulator, said second film having a conductive surface, a sensor chamber defining part mounted on said other side of said second film and having an opening for communication with a sensing atmosphere, whereby one of said first and second films includes openings it its surface to permit fluid to flow through said openings and said other of said first and second films is solid and responds to change in pressure in said sensor chamber to move away from or toward said one of said flexible diaphragms, and electrical connections contacting said first and said second films and adapted to measure the capacitance between said films as a function of said pressure in said sensor chamber introduced through said opening and causing said one flexible films to move with respect to said other of said films, the improvement comprising:
- a non-perforated flexible diaphragm mounted between said first and second films and both of said first and second films are perforated, said non-perforated diaphragm being spaced from said first and second films such that said non-perforated diaphragm is adapted to flex toward said first film when pressure increases in said opening and is adapted to flex toward said second film when pressure decreases in said opening to change the capacitance between said non-perforated diaphragm and at least one of said first and second films.

2. The device of claim 1, wherein said non-perforated diaphragm is mounted on one side in communication with said insulator and on the other side on a second insulator positioned between said non-perforated diaphragm and said second film, said second film being mounted on said second insulator and said sensor chamber defining part.

3. The device of claim 2, wherein said non-perforated diaphragm is a plastic film having a conductive portion on its surface.

4. The device of claim 3, wherein said plastic film has a metalized portion on its surface.

5. The device of claim 3, wherein said plastic film has a dielectric film on a portion of its surface.

6. A device for sensing pressure, comprising:
- a sealed chamber defining part;
- a first perforated film having two sides and mounted on one side in communication with said chamber in said sealed chamber defining part, said first film having a conductive surface;
- a first insulator mounted on said other side of said first film;
- a non-perforated flexible diaphragm having two sides and mounted on one side in communication with said first insulator, said non-perforated flexible diaphragm having a conductive surface;
- a second insulator mounted on one side on said non-perforated diaphragm;
- a second perforated film having two sides and mounted on the other side of said second insulator;
- a sensor chamber defining part mounted on said other side of said second film and having an opening for communication with a sensing atmosphere; and
- electrical connections contacting said first and said second films and said non-perforated diaphragm and adapted to measure the capacitance between said diaphragm and at least one film as a function of said pressure in said sensor chamber introduced through said opening and causing said one non-perforated diaphragm to move with respect to one of said films.

7. The device of claim 6, wherein said non-perforated diaphragm is a plastic film having a conductive portion on its surface.

8. The device of claim 7, wherein said plastic film has a metalized portion on its surface.

9. The device of claim 7, wherein said plastic film has a dielectric film on a portion of its surface.

10. A device for sensing pressure, comprising:
- sealed chamber defining part means for defining a sealed chamber;
- first perforated film means for transmitting an atmosphere into said sealed chamber means and having two sides and mounted on one side in communication with said chamber means in said sealed chamber defining part, said first film means having a conductive surface;
- first insulator means for spacing said first film means and mounted on said other side of said first film;
- non-perforated flexible diaphragm means for flexing under changes in pressure and having two sides and mounted on one side in communication with said first insulator means, said non-perforated flexible diaphragm means having a conductive surface;
- second insulator means for spacing said non-perforated diaphragm and mounted on one side on said non-perforated diaphragm means;
- second perforated film means for transmitting an atmosphere to said non-perforated diaphragm means and having two sides and mounted on the other side of said second insulator means;
- a sensor chamber defining part mounted on said other side of said second flexible diaphragm means and having port means for communication with a sensing atmosphere; and
- electrical connections contacting said first and said second film means and said non-perforated diaphragm means and adapted to measure the capacitance as a function of said pressure in said sensor chamber introduced through said opening and causing said one non-perforated diaphragm to move with respect to one of said films.

11. The device of claim 10, wherein said non-perforated diaphragm is a plastic film having a conductive portion on its surface.

12. The device of claim 11, wherein said plastic film has a metalized portion on its surface.

13. The device of claim 11, wherein said plastic film has a dielectric film on a portion of its surface.

\* \* \* \* \*